United States Patent [19]

Kaselaan et al.

[11] 4,198,856
[45] Apr. 22, 1980

[54] SMOKE BOMB ISOLATION AND CONTAINMENT DEVICE

[76] Inventors: Valdur Kaselaan, 103 Redford Rd., Oreland, Pa. 19075; Joseph H. Appleton, Coachman East Apts., No. 4001, Lindenwold, N.J. 08021

[21] Appl. No.: 932,831

[22] Filed: Aug. 11, 1978

[51] Int. Cl.² ............................................. G01M 3/20
[52] U.S. Cl. .................................................. 73/40.7
[58] Field of Search ........................... 73/40.7, 40.5 R; 239/129

[56] References Cited

U.S. PATENT DOCUMENTS

| | | | |
|---|---|---|---|
| 3,395,514 | 8/1968 | Bub | 73/40.7 X |
| 3,522,724 | 8/1970 | Knab | 73/40.7 |
| 4,155,249 | 5/1979 | Scott | 73/40.7 |

FOREIGN PATENT DOCUMENTS

| | | | |
|---|---|---|---|
| 567680 | 12/1932 | Fed. Rep. of Germany | 73/40.5 R |
| 16952 | of 1884 | United Kingdom | 73/40.5 R |
| 5790 | of 1900 | United Kingdom | 73/40.5 R |

*Primary Examiner*—Gerald Goldberg
*Assistant Examiner*—Joseph W. Roskos
*Attorney, Agent, or Firm*—Caesar, Rivise, Bernstein & Cohen, Ltd.

[57] ABSTRACT

Apparatus for forcing smoke produced by a smoke bomb into a cavity to test for leaks therein. The apparatus includes a housing for receipt of an ignitable smoke bomb to produce smoke therein, a blower and an engine to operate the blower. The blower includes a housing having an inlet, an outlet and a wire mesh screen barrier interposed therebetween. The smoke bomb housing is arranged to support the smoke bomb therein between the inlet and the wire mesh barrier. The outlet of the blower housing is disposed over the cavity and in communication therewith. In operation the blower draws air from the ambient atmosphere into the smoke bomb housing and about the ignited bomb. The cloud of smoke in the housing is drawn through the wire mesh screen, into the blower housing from when it is forced into the cavity. The wire mesh screen acts to arrest any sparks or flame produced by the ignition of the smoke bomb from gaining ingress into the blower housing and hence the communicating cavity.

5 Claims, 4 Drawing Figures

SMOKE BOMB ISOLATION AND CONTAINMENT DEVICE

This invention relates generally to apparatus for introducing smoke into cavities or passageways, such as sewer lines, pipes, etc., to determine the presence of leaks and more particularly to apparatus for use with ignitable smoke bombs for forcing smoke produced by said bombs into cavities or passageways and without presenting a fire or explosion hazard in the event that the cavity or passageway has a combustible gas therein.

It is common practice in construction applications, such as the construction of sewer lines and the like, to test such lines to determine if they are subject to excessive infiltration/inflow. Heretofore such testing has been accomplished by the use of ignitable smoke bombs and air/smoke blowing apparatus. The testing procedure using such equipment entails mounting the air/smoke blower over a manhole in the sewer line and suspending under the blower and inside the manhole an ignited smoke bomb. When the air/smoke blower is actuated ambient air from the atmosphere is drawn into the blower and forced into the manhole in which the smoke bomb is disposed. This action produces a cloud of smoke which is forced through the sewer lines by the blower. Leaks in the sewer line are then exposed by the presence of smoke exiting therethrough.

It has been found that combustible gasses frequently exist in sewer lines or other cavities to be tested for leaks using the smoke testing technique. While various smoke bombs, grenades, etc., which are commercially available, such as those offered by Superior Signal Company, Inc., of Spotswood, New Jersey, are themselves nonexplosive, the ignition of such bombs is accomplished via a fuse, which does give off sparks when ignited. The existence of any sparks within a sewer line presents a potential explosion hazard even if at the time the bomb is placed in the line there is no combustible gas therein, since such gas may migrate into the area after the bomb has been lit and placed therein.

Accordingly, it is a general object of the instant invention to overcome the disadvantages of prior art smoke testing apparatus and techniques.

Another object of the instant invention is to provide apparatus for use with ignitable smoke bombs for forcing smoke into cavities to be tested and which apparatus obviates any explosion hazard by isolating the smoke bomb from the cavity.

Other objects and many of the attendant advantages of the instant invention are achieved by providing apparatus for forcing smoke produced by an ignitable smoke bomb into a cavity having an opening to determine the presence of leaks in said cavity. The apparatus comprises a smoke source housing and a blower assembly. The blower assembly includes a housing having an inlet, an outlet and a blower mounted within the housing. The housing is arranged to be mounted with its outlet in communication with the opening in the cavity. The smoke source housing is adapted to support a smoke bomb therein and includes an inlet port, an outlet port and air pervious, spark barrier means interposed therebetween. The smoke source housing is mounted on the blower housing, with the outlet of the smoke source housing in communication with the inlet of the blower housing. The blower is operative to draw air from the ambient atmosphere through the inlet port into the smoke source housing, past the smoke bomb, through the barrier means and the blower means into the cavity so that the smoke produced by the bomb is forced into the cavity while any sparks produced by the smoke bomb are arrested in the barrier means and isolated from said cavity.

Other objects and many of the attendant advantages of this invention will be readily appreciated as the same becomes better understood by reference to the following detailed description when considered in connection with the accompanying drawings wherein.

Figure 1:
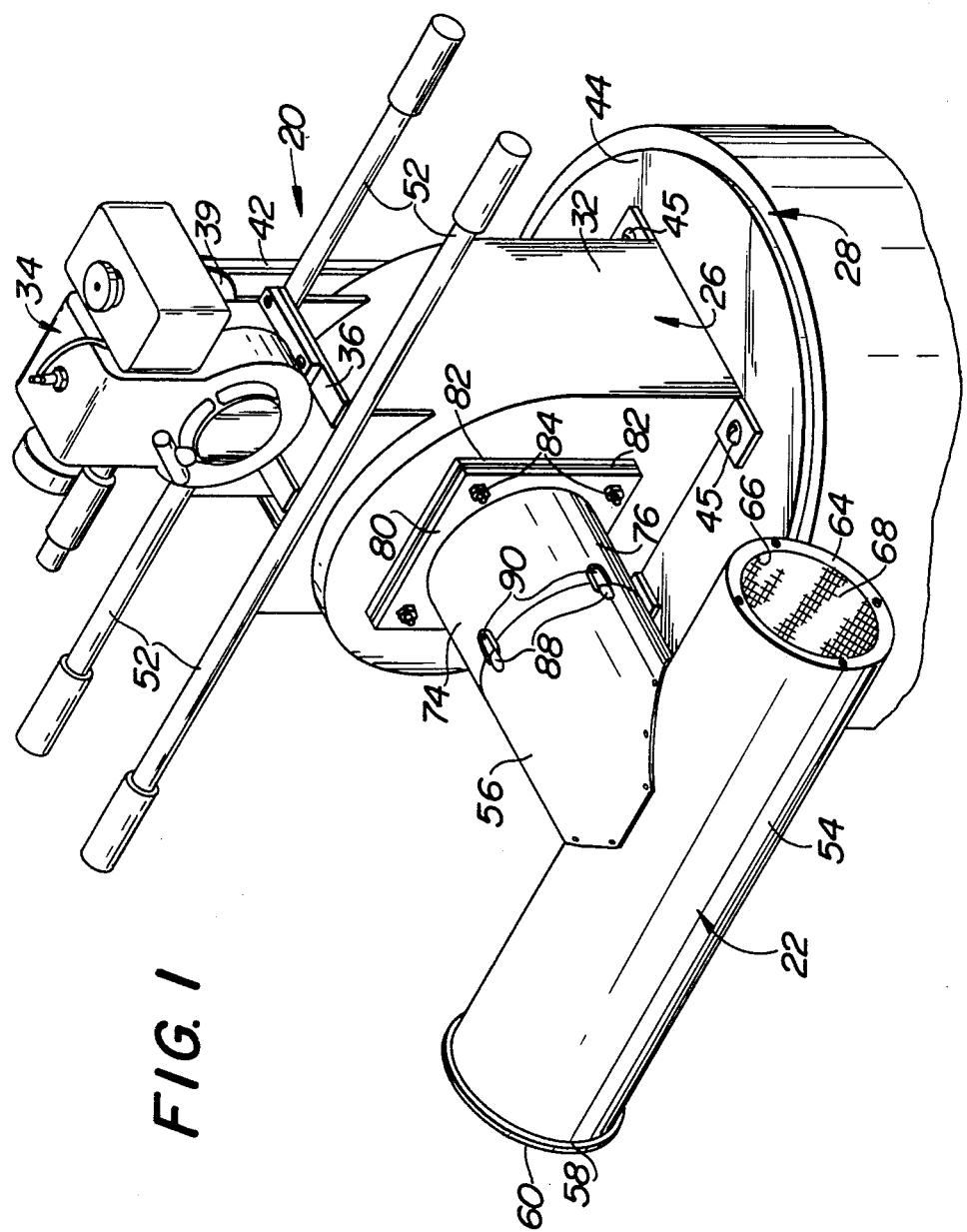
FIG. 1 is a perspective view of the apparatus of the instant invention shown mounted on a manhole of a sewer line for introducing smoke therein.

Referring now to the various figures of the drawings wherein like reference characters refer to like parts, there is shown generally at 20 in FIG. 1 apparatus in accordance with the instant invention. The apparatus 20 basically comprises the housing 22 in which a smoke source, such as a smoke bomb or grenade 24 (FIG. 2), is to be located, and a blower assembly 26 arranged to draw the smoke produced by the bomb within its housing for introduction into a sewer line (not shown) or other cavity having an opening or manhole 28.

In accordance with the primary aspect of this invention spark arresting, barrier means, as well as the blower assembly itself, are interposed between the cavity to be subjected to smoke and the smoke bomb itself so that any sparks which may be produced during the ignition of the smoke bomb are precluded from gaining ingress into the cavity. This isolation substantially precludes the occurrence of accidental explosions which may result from the ignition of combustible gasses existing in the cavity.

The blower assembly 26 of the apparatus 20 is a conventional device such as the commercially available Model 10S Blower offered by Superior Signal Company, Inc., of Spotswood, New Jersey. In view of the conventional construction of the blower assembly and in the interest of brevity a detailed description of all of the structure of the blower assembly 26 will not be made herein. Suffice it to say that the blower assembly basically comprises a blower or impeller 30 (FIG. 2) mounted within a housing 32 and a gasoline powered engine 34.

The engine provides rotary power for the impeller and is mounted on a support bracket 36 located at the top of the blower housing 32. The impeller 30 is mounted on a rotary shaft 38 having a pulley 40 on the free end thereof and around which a flexible drive belt 42 is disposed. The drive belt 42 is coupled to the rotary output pulley 39 of the engine 34.

The blower housing 26 is fixedly mounted on a base plate 44 of plural stove screws 45. The base plate 44 includes a central opening 46. The blower housing 32 includes an inlet 48 in its sidewall and an outlet 50 at the bottom thereof and communicating with the central opening 46 in the base plate 44. The base plate 44 is a planar member which serves to support and hold the apparatus over the manhole 28 and is of sufficiently large diameter to completely cover the manhole to preclude smoke from escaping therethrough during operation of the device 20. A horizontal pair of handles 52 are mounted on the bracket 36 to serve as the means for transporting the apparatus 20 to the manhole 28.

Figure 2:
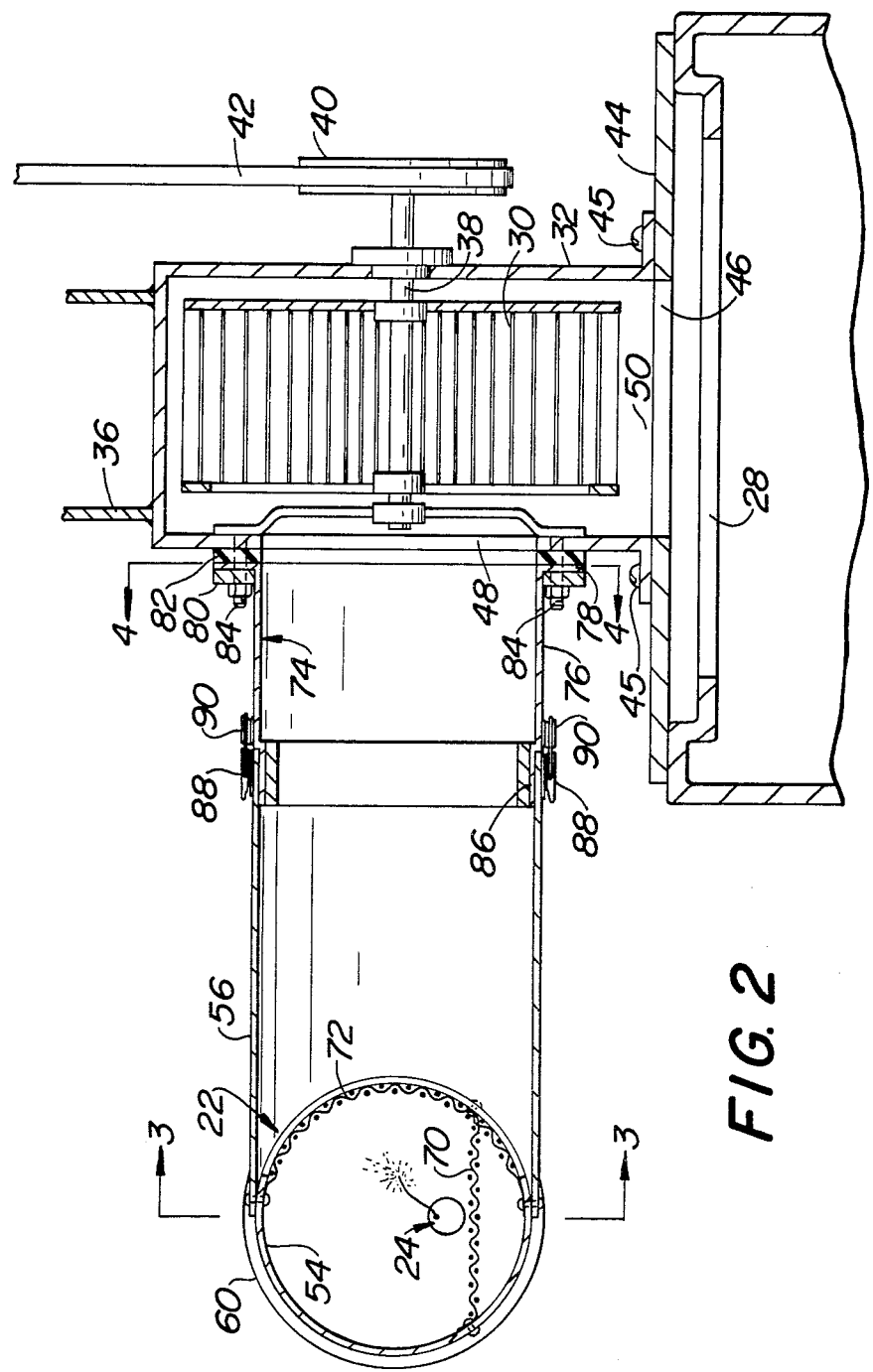
FIG. 2 is an enlarged sectional view of a portion of the apparatus shown in FIG. 1.
Figure 3:
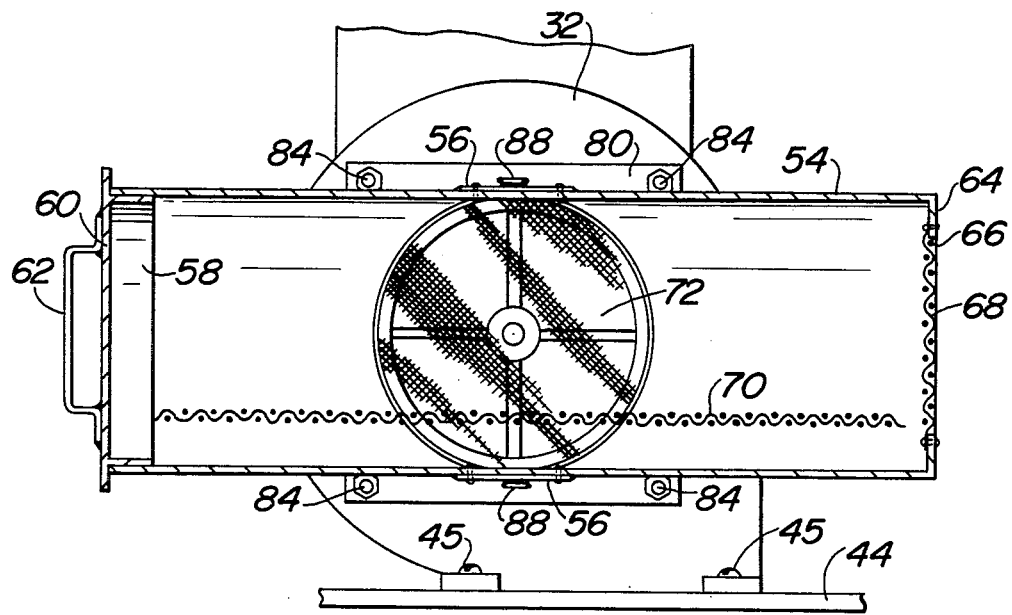
FIG. 3 is a sectional view taken along line 3—3 of FIG. 2.
Figure 4:
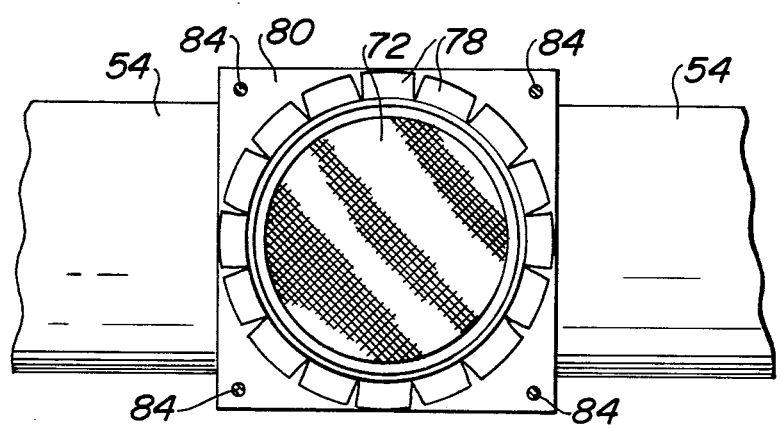
FIG. 4 is a sectional view taken along line 4—4 of FIG. 2.

As can be seen in FIGS. 1, 2 and 3 the smoke source housing 22 is a T-shaped member including a tubular portion 54 which forms the smoke source chamber and a tubular connecting portion 56 extending normally to the smoke chamber portion 54. One end 54 of the smoke chamber is open at 58. A removable cap 60 is frictionally fit within the opening to seal the opening. The cap includes a handle 62 for facilitating its removal from the opening. The cap is removable to provide access to the interior of the smoke chamber 54 so that a smoke bomb can be placed therein or removed therefrom. The opposite end of the smoke chamber 54 is in the form of a permanently secured cap having a large port 68 therein. A wire mesh screen 68 is mounted within the port. The port serves as the air intake or inlet for the apparatus 20 and the screen as a filter therefore.

A cradle 70 (FIGS. 2 and 3) is formed of a wire mesh and serves as the support for the smoke bomb 24 while holding the bomb away from the walls of the housing to enable air to readily flow around the bomb, thereby expediting the production of smoke.

The sidewall of the smoke chamber 54 at the interface with the connecting portion 56 includes an opening in which a wire mesh screen barrier 72 is mounted. The screen barrier serves as a spark arrestor to prevent any sparks produced during the ignition of the smoke bomb from passing therethrough and into the manhole. It has been found that 8×8—0.025 inch (0.64 mm) diameter galvanized steel mesh is particularly suitable for precluding sparks from passing therethrough. The same type wire mesh is preferably used for the cradle 70.

The smoke source housing 56 is releasably secured to the blower housing 32 by mounting means 74 and is removable in the interests of portability and storage. The mounting means basically comprises a collar 76 having a peripheral end flange 78 (FIG. 2), a mounting plate 80 having a central opening therein through which the collar 76 extends and a vibration insulating pad 82. The pad is preferably formed of a resilient material, e.g., foam rubber, and includes a central opening communicating with the inlet 48 of the blower housing 32 and with the interior of the collar 76. The pad is interposed between the wall of the blower housing and the flange of the collar. Respective bolts 84 extend from the blower housing sidewall through aligned openings in the mounting plate 80, the flange 78 and the insulating pad 82, to permanently secure the collar to the housing.

The free end of the collar includes an offset portion 86 adapted to be disposed within the free end of the connecting portion 56 of the smoke source housing 22. A plurality of spring clasps 88 are mounted at equidistantly spaced locations about the periphery of the end of the connection portion 56 and cooperate with corresponding catches 90 similarly mounted about the periphery of the free end of the collar 76.

Operation of the apparatus is as follows: the apparatus 20 is located over the manhole 28 of the sewer line or other cavity to be tested by the introduction of smoke therein. The cap 60 is removed from opening 58 and a smoke bomb 24 is inserted within the smoke chamber 54 and on cradle 70. The smoke bomb is ignited, the cap 60 replaced and the engine 34 started. The operation of the engine rotates the blower impeller 30, via the pulley 39, belt 42, pulley 40 and shaft 38. This action causes air to be drawn through the mesh screen 68 in the inlet 66 and into the smoke chamber 54 where the air mixes with the smoke from the ignited bomb within the chamber to form a cloud of smoke which is drawn through the wire mesh barrier 72, the connecting portion 56, the collar 76, and the blower housing inlet 48 into the blower housing. From there the smoke is forced through housing outlet 50 and the central opening 46 in the base plate 44 into the manhole 28. The base plate 44 seals the periphery of the manhole to prevent smoke from escaping at the manhole.

As will be appreciated by those skilled in the art since the apparatus 20 of this invention locates the smoke bomb upstream of the blower the smoke bomb is effectively isolated from the manhole. In addition the presence of the wire mesh barrier screen 74 between the smoke bomb housing and the blower precludes any sparks produced by the smoke bomb fuse from being carried into and through the blower into the manhole.

As will be appreciated from the foregoing the instant apparatus substantially eliminates the danger of smoke bomb induced ignition of combustible gasses in sewer lines or other cavities to be tested for leaks. In addition the apparatus is simple in construction and relatively low in cost.

Without further elaboration, the foregoing will so fully illustrate our invention that others may, by applying current or future knowledge, readily adapt the same for use under various conditions of service.

What is claimed as the invention is:

1. Portable apparatus for forcing smoke produced by an ignitable smoke bomb into a cavity to determine the presence of leaks therein, said cavity having an opening, said apparatus comprising a smoke source housing and a blower assembly, said outlet and blower means therein, said housing being arranged to be mounted with its outlet in communication with the opening in said cavity, and having means to seal the opening of said cavity to the ambient atmosphere, said smoke source housing being adapted to support a smoke bomb therein and including an inlet port, an outlet port and air pervious, spark barrier means interposed therebetween, said barrier means comprising a wire-mesh screen, said smoke source housing being releasably mounted on said blower housing with the outlet of the smoke source housing in communication with the inlet of the blower housing, said smoke source housing including an air pervious cradle for supporting said smoke bomb in a position to enable air to readily flow around the bomb and an opening having a removable closure to enable the bomb to be placed on said cradle, said blower means being operative to draw air from the ambient atmosphere through the inlet port into the smoke source housing, through the cradle around and past the smoke bomb, through the wire-mesh barrier means and then through the blower means into said cavity so that the smoke produced by the bomb is forced into the cavity while any sparks produced by the smoke bomb are arrested in the barrier means and isolated from said cavity by said barrier means and said blower means.

2. The apparatus of claim 1 wherein said cradle is formed of wire mesh.

3. The apparatus of claim 2 wherein the inlet port to said smoke housing includes a wire mesh screen.

4. The apparatus of claim 3 wherein said blower assembly additionally comprises motor means mounted on said blower housing for operation said blower means.

5. The apparatus of claim 4 wherein said blower assembly additionally comprises handle means mounted on said blower housing for effecting the transportation and placement of said apparatus.

* * * * *